Oct. 26, 1943.   A. W. CURTIS   2,332,506
SEPARATING AND GRADING MACHINE
Filed Oct. 5, 1939   7 Sheets-Sheet 3

Inventor
ARLIE W. CURTIS

Oct. 26, 1943.   A. W. CURTIS   2,332,506
SEPARATING AND GRADING MACHINE
Filed Oct. 5, 1939   7 Sheets-Sheet 5

Patented Oct. 26, 1943

2,332,506

UNITED STATES PATENT OFFICE 2,332,506

SEPARATING AND GRADING MACHINE

Arlie W. Curtis, Erie, Pa.

Application October 5, 1939, Serial No. 298,148

6 Claims. (Cl. 209—75)

This invention relates to an improved separating and grading machine more particularly adapted for use for separating and grading materials according to their length, breadth (width), and thickness.

Another object of the invention is to provide a machine of this character which is particularly suited for use in grading grains of various kinds.

A further object of the invention is to provide a separating and grading machine having a carriage mounted for high speed oscillatory movement for effecting the shifting of the materials to be graded and separated.

A further object of the invention is to provide a separating and grading machine wherein means are employed for receiving the separated and graded materials in proper compartments.

Still another object of the invention is to provide a separating and grading machine which will be highly efficient in use and which will be relatively simple in construction.

And the invention has as a still further object to provide a separating and grading machine which will grade material such as grain kernels according to the different angles of their surfaces, other than 90° angles, with respect to their length, width and thickness.

Other and incidental objects of the invention not hereinabove mentioned will become apparent during the course of the following description.

My invention is illustrated in the accompanying drawings, wherein.

Figure 2:
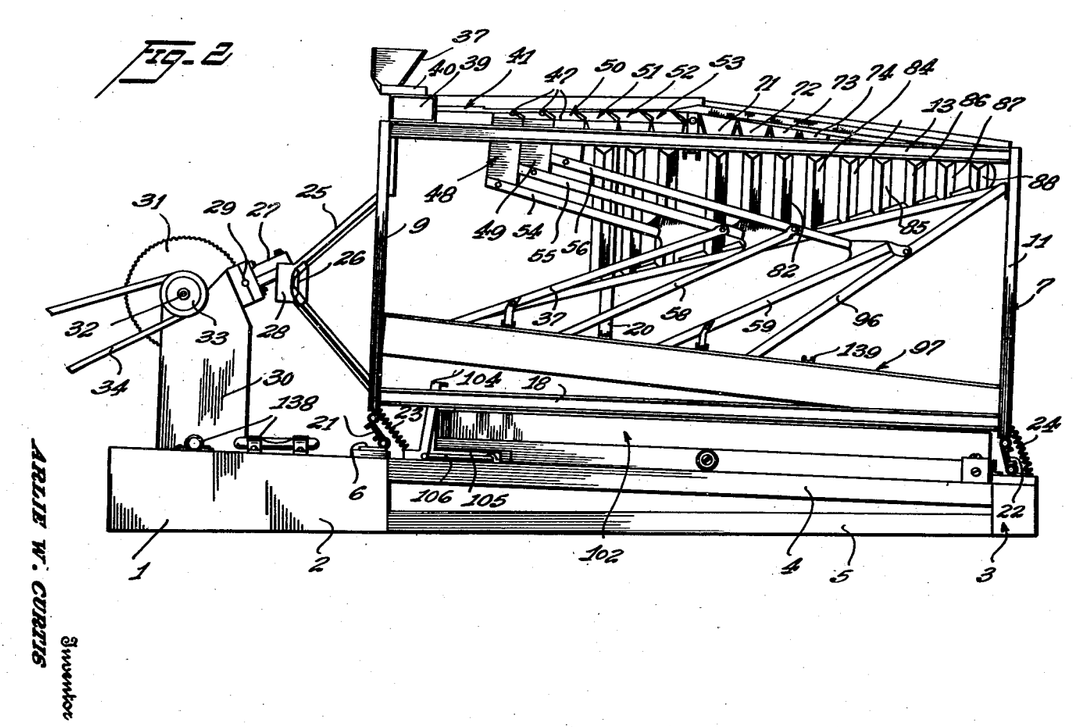
Figure 2 is a side elevation of the machine.

Referring now more particularly to the drawings, wherein like numerals of reference will be seen to designate like parts throughout the various views, the numeral 1 indicates, in general, the base of my improved separating and grading machine. The base is preferably of rectangular shape, although it should be understood that the shape is not important. The base, as best seen in Figure 2 of the drawings, is slightly tapered toward one end. The larger end of the base is indicated at 2 and said larger end is connected to a connecting block 3, at the smaller end of said base, by base boards 4 and 5, the base board 4 being inclined toward the base board 5 and both of said boards being connected to the connecting block 3. Although not shown, it should be understood that suitable legs may be placed under the base for supporting the machine at any desired height. It should also be understood throughout the description that my improved separating and grading machine may be of any size desired, depending upon the materials to be graded and the volume to be handled.

Mounted on the upper surface of the base 1, at the inner terminal of the relatively large portion 2, is a mounting strip 6, this mounting strip extending transversely throughout the width of the base.

Figure 1:
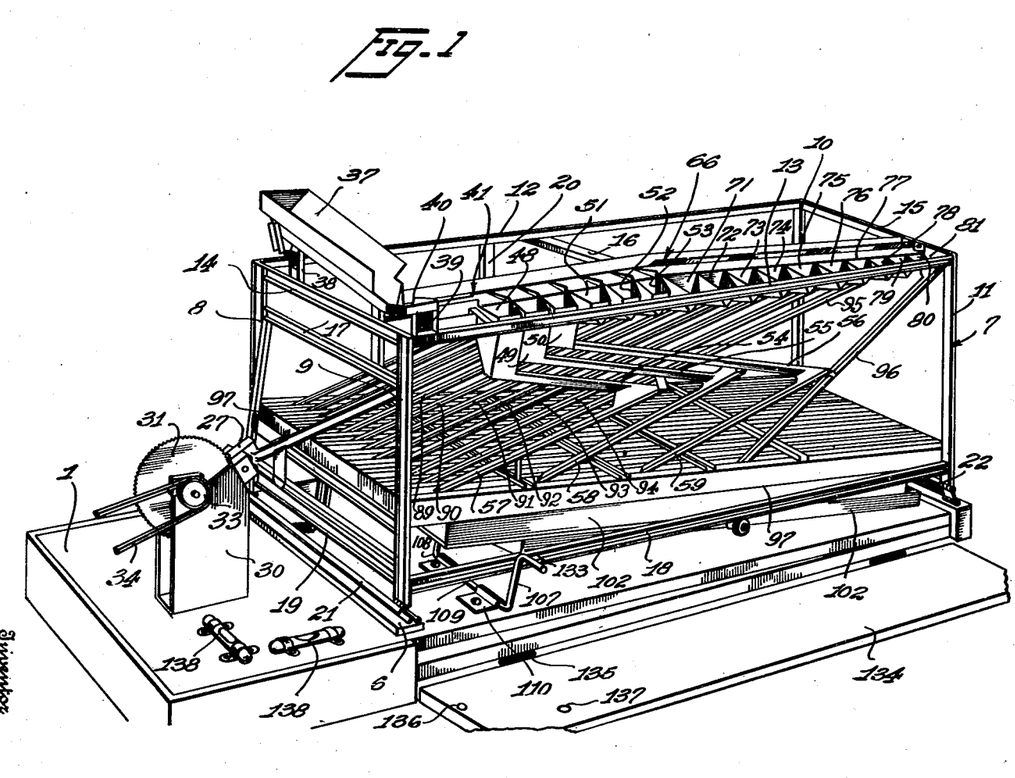
Figure 1 is a perspective view of my complete separating and grading machine.

In order to support the grading mechanism and the chutes for directing the materials to the grading mechanism, and other structure associated with said grading mechanism and chutes, I provide a carriage shown generally at 7. The carriage 7 is of substantially skeleton formation and includes corner posts 8, 9, 10 and 11, which corner posts are connected at their upper corresponding ends by side and end bars 12, 13, 14 and 15. A brace bar 16 extends between the side bars 12 and 13, substantially midway of their length. Brace bars 17, located in parallel spaced relation to the brace bar 16, provide additional bracing for the inner ends of the carriage. At their corresponding lower ends, the corner posts 8, 9, 10 and 11 are connected by lower side bars 18. A lower end bar 19 also provides connection for the lower ends of the corner posts 8 and 9. A vertical brace 20 provides intermediate bracing for the rear side, as seen in Figure 1, of the carriage. The carriage is mounted for oscillatory movement by means of horizontally extending links 21 and 22. These links extend throughout the entire width of the carriage and have their corresponding upper portions connected to the corresponding lower end portions of the corner posts 8, 9, 10 and 11. In other words, the link 21 has its opposite ends pivotally connected to the lower corresponding ends of the corner posts 8 and 9 while the link 22 has its opposite ends connected to the opposite ends of the corner posts 10 and 11. The link 21 has its lower opposite end surfaces pivotally connected to the mounting strip 6 while the link 22 has its opposite end surfaces pivotally connected to the block 3. It will be understood that the carriage 7 will thus be permitted to rock on the links 21 and 22 in an oscillatory manner. Springs 23 and 24 are connected between the forward and rear central portions of the carriage and the forward and rear portions of the base and serve to retain the carriage under tension with respect to the base.

Figure 10:
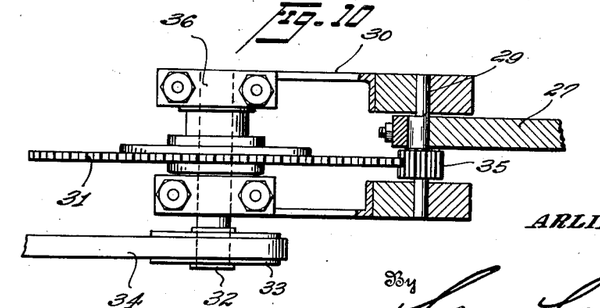
Figure 10 is an enlarged detail sectional view of the oscillating mechanism employed.

At the end of the carriage adjacent the portion 2 of the base, I provide pyramidally arranged beams 25 which are connected together at their outer ends and are braced by means of bracing straps 26. A pivoted connecting link 27 is connected to a yoke 28 at the apices of the beams 25. The link 27 is eccentrically mounted on a stub shaft 29. The stub shaft is mounted in a U-shaped mounting standard 30 which has its bight portion connected with the portion 2 of the base 1. The standard 30 carries a driving gear 31 which is mounted on a shaft 32. A driving pulley 33 is mounted on the outer end of the shaft 32 and has trained thereabout a belt 34 which has its opposite end portion connected with a source of power. The driving gear 31 meshes with a pinion 35 on the stub shaft 29. Bearings 36 effectively mount the shaft 33 in the standard. It will now be understood that rotative movement transmitted by the belt 34 to the driving pulley 33 will effect rotation of the shaft 32 and the drive gear 31. The driving gear will drive the pinion 35 and said pinion will shift the link 27, which is eccentrically mounted on the shaft 29, as stated, in an oscillatory manner. Oscillatory movement will be imparted to the carriage through the beams 25 with the result that said carriage will be shifted back and forth on the links 21 and 22. The gear 31 is relatively large with respect to the pinion 35 so that the carriage will be oscillated at a relatively high rate of speed. More specifically, the size of the gear 31 is such that when said driving gear is revolved at a speed of one hundred twenty revolutions per minute, a speed of thirteen hundred seventy revolutions per minute will be imparted to the links 27. The carriage will be oscillated at a speed of thirteen hundred seventy backward and forward movements per minute.

Figures 3, 5, 6, 7:
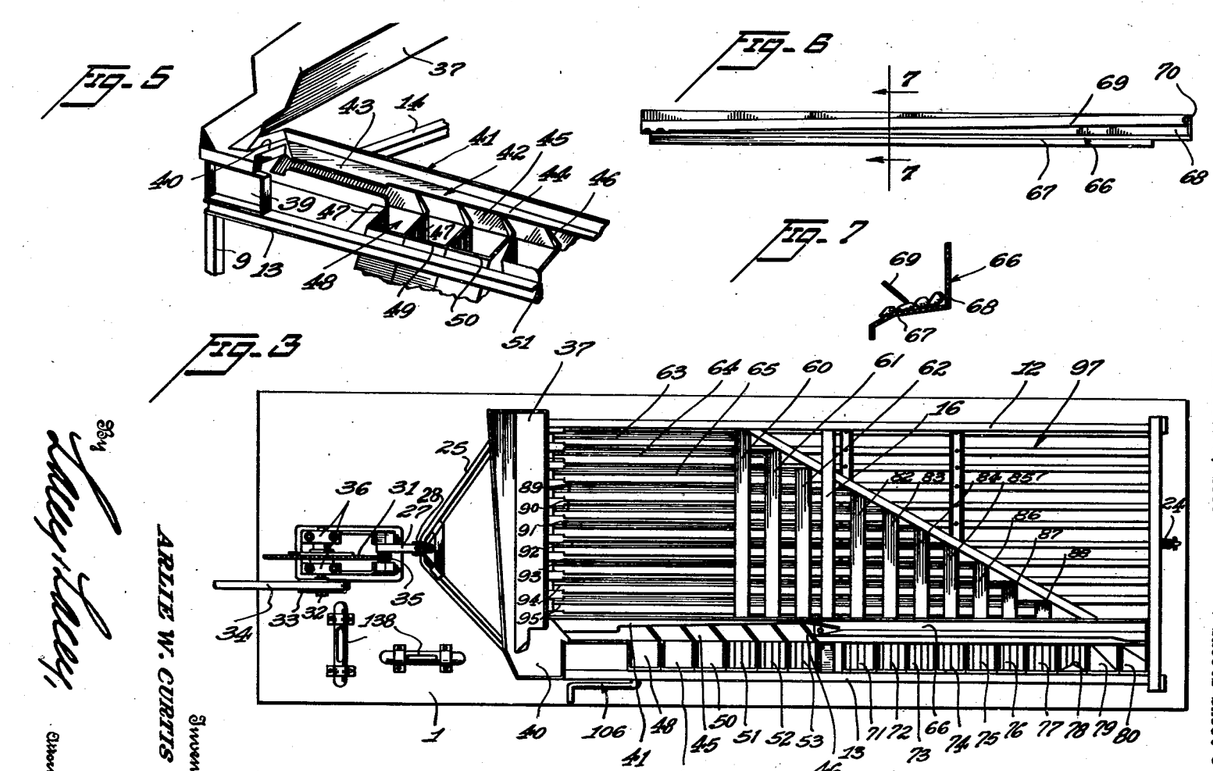
Figure 3 is a top plan view of the machine.
Figure 5 is an enlarged detail perspective view of the feed chute and some of the width grading chutes.
Figure 6 is a detail plan view of the thickness grading unit.
Figure 7 is a sectional view, on an enlarged scale, on the line 7—7 of Figure 6.

Reference is now had to the separating and grading mechanism. Referring again to Figures 1, 2 and 3 of the drawings, the numeral 37 indicates a feed chute which is mounted on one end of the machine by means of braces 38 and 39. The feed chute has a discharge trough 40 which is connected with a width grading unit 41. The width grading unit 41 is of substantially acute angular contour and includes a width grading bar 42 which comprises an entering portion 43 and a grading portion 44 which grading portion, as best seen in Figure 5, is tapered in width throughout its length. Beneath the bar 42 there is mounted a downwardly inclined discharge plate 45 on which are mounted a plurality of obliquely disposed guides 46, which guides are adapted for leading graded material into the mouths 47 of a plurality of discharge chutes 48, 49, 50, 51, 52 and 53. The discharge chutes 48, 49 and 50 have downwardly inclined portions 54, 55 and 56 which are connected at their corresponding lower ends with conducting chutes 57, 58, 59. As best seen in Figure 3 of the drawings, the chutes 51, 52 and 53 are provided with downwardly and transversely disposed portions 60, 61 and 62 which communicate with conducting chutes 63, 64 and 65.

The width grading unit 41 has connected to the end thereof remote from the portion 40, a thickness grading unit 66. The thickness grading unit is best seen in Figures 1, 6 and 7 of the drawings. The unit includes a grading bar 67 which is downwardly inclined and has a flange 68 rising from the rear edge thereof. The thickness grading unit includes a thickness measuring bar 69 which extends throughout the length of the unit. The bar 69 is connected at one end to an ear 70 on the flange 68. The opposite end of the thickness measuring bar is slightly twisted and is connected to the discharge plate 45 at the junction between said plate and the width grading unit. As best seen in Figure 7, the thickness measuring bar 69 is obliquely disposed with respect to the flange 68 and the downwardly inclined grading bar 67. The purpose of this is to tend to retain the grain or other material within the thickness grading unit so that spilling will not take place. The grading bar 67 of the thickness grading unit is so arranged with respect to the thickness measuring bar that the inner end of said thickness measuring bar is disposed with its edge nearly in contact with the surface of the grading bar 67. However, as the thickness measuring bar extends toward the far end of the unit, the space between it and the grading bar gradually increases. The purpose of this arrangement is to restrict the various sizes of grain kernels or other material so that the smaller of said kernels will, as best seen in Figure 7, pass between the grading bar and the thickness measuring bar first. However, as the bars diverge toward their farther ends, it will be possible for kernels of progressively larger size to pass beneath the thickness measuring bar.

In order to receive the grain kernels which have been graded according to their thickness, there are provided a plurality (preferably ten) of chutes which are numbered 71 through 80. A chute 81 is connected with the discharge end of the thickness grading unit for the reception of kernels which are too large to pass between the grading bar and the thickness measuring bar. The chutes 71 through 77 are connected, by means of downwardly inclined transversely directed troughs 82, 83, 84, 85, 86, 87 and 88 respectively, with discharge troughs 89, 90, 91, 92, 93, 94 and 95. It will be understood that grain kernels or the like which have been graded in accordance with their thickness, will pass from the grading bar 67 into the chutes 71 through 80 inclusive and will be led by the troughs 82 through 88 respectively into the troughs 89 through 95 respectively, which last mentioned troughs communicate with the units of the length grading units to be described presently. The chute 81 is connected directly with the length grading unit assembly by means of a trough 96. As will be clearly seen in Figures 1 and 2, the troughs 54, 55, and 56 are connected to each other to provide bracing means and are connected to the trough 96 for the same purpose, so that the troughs 54, 55, 56 and 96 will be effectively braced on the carriage. The chutes 48 through 53 as well as the chutes 71 through 81, are supported on the carriage between the side bar 13 and the bars 45 and 67.

Figure 4:
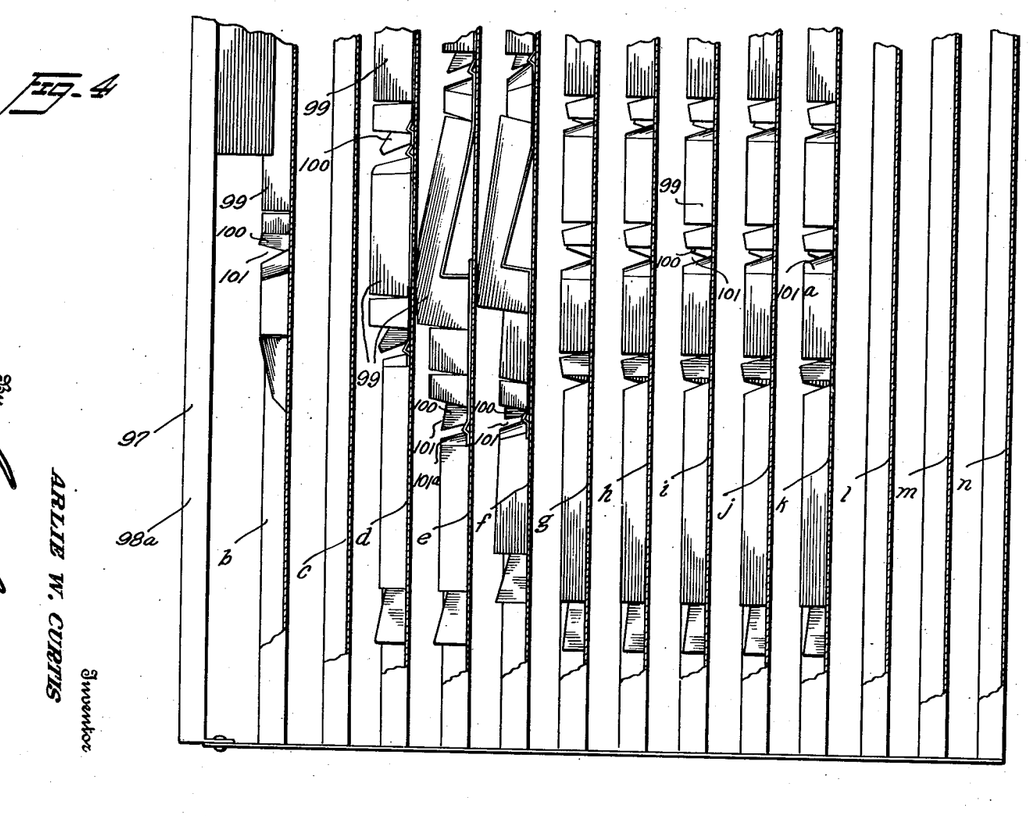
Figure 4 is a top plan view, partly in section, showing a part of the grading mechanism employed.
Figure 8:
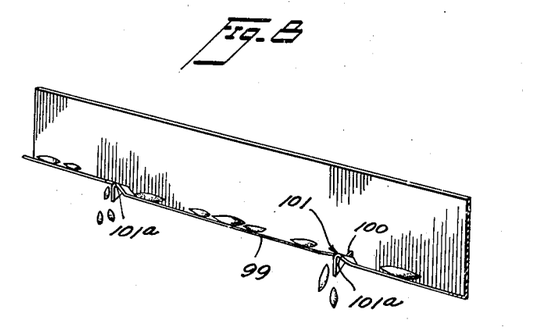
Figure 8 is an enlarged perspective view of one of the grading units employed.

In order to grade the grain kernels or the like according to length, I provide a length grading unit assembly 97. The length grading unit 97 is mounted in the carriage 7 near its lower end and is inclined, that is to say, the higher end of the unit 97 is located at the end of the carriage adjacent the oscillating mechanism while, of course, the lower end of said unit 97 is disposed at the opposite end of the carriage. The length grading unit 97 includes a plurality of longitudinally extending laterally spaced channel bars 98. The bars 98, for the sake of convenience, are indicated by the letters *a* through *n*. These bars are best illustrated in top plan in Figure 4 of the drawings and are adapted for carrying the length grading units which are of different sizes so that they will be capable of handling grain kernels or the like of various sizes, said grain kernels being fed to the various length grading units by the troughs 63, 64, 65 and 89 through 95, which troughs, as heretofore explained, lead from the width and thickness grading units. Each of the length grading units includes a spreader flange 99 and a deflector 100. A plurality of the length grading units are mounted on each of the channel bars so that the deflector of one unit will lie in longitudinally spaced relation to the spreader flange 99 of the next adjacent length grading unit, thus defining a discharge opening 101. The arrangement of the length grading units will be described in more detail during the description of the operation of the machine.

For receiving the different graded grain kernels, a bin 102 is provided. In operative position, the bin is disposed beneath the length grading unit assembly 97. More specifically, the bin 102 is formed with a base plate 103 which is adapted for sliding engagement between the connecting block 3 and laterally spaced stops 104. The base plate 103 is cut away at the under side of one end, as shown at 105, so that accommodation for a raising crank 106 will be provided. The raising crank 106 is provided with a crank portion 107 and a lever portion 108. The crank is also provided with a straight portion 109 which is swingingly connected to the base member 4 by loops 110.

Figure 9:
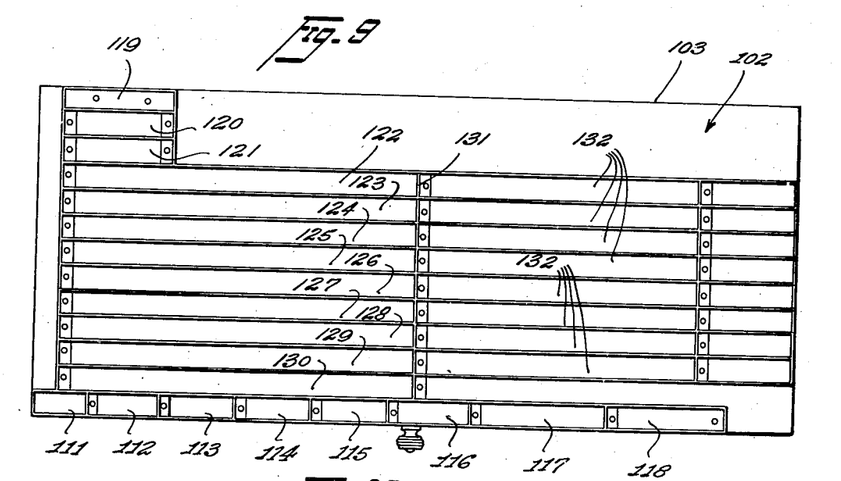
Figure 9 is a top plan view of the bin for receiving the graded material.

As best seen in Figure 9, the bin 102 is provided with a plurality of compartments 111, 112, 113, 114, 115, 116, 117 and 118, which are arranged in a convenient series at the front of the bin. Compartments 119, 120, and 121 are carried at the rear of the bin near the left side, as seen in Figure 9. The bins 111, 112 and 113, are adapted for the reception of grain kernels from the chutes 48, 49 and 50, which kernels are received from the grading unit. The compartments 119, 120 and 121 are also adapted for receiving kernels from the chutes 51, 52 and 53 which are disposed adjacent said width grading unit. Relatively long compartments 122, 123, 124, 125, 126, 127, 128, 129, and 130 are defined by partitions 131 which divide said compartments from companion compartments 132 which are similar to the compartments 122 through 130. The compartments 122 through 130 as well as the compartments 132, are adapted for the reception of graded material from the length grading unit.

The bin 102 is adapted to be slid between the lower side bar 18 and the upper base member into position beneath the length grading unit assembly, with the cut away portion overhanging the lever portion 108. When the crank portion 107 is raised, the lever portion will be swung upwardly for engaging the under surface of the cut away portion 105, when one end of the bin will be swung upwardly to underlie the length grading unit assembly in such a way that the compartments will be positioned beneath the grading units so as to catch the graded kernels. The crank 106 will be held in raised position by the weight of the bin thereon. Suitable securing means for retaining the crank 106 in raised operative position, such as a stop 133, may be employed. In order to protect the bin, a door 134 is employed. The door is connected with the base 1 by spring hinges 135. Said door is provided with sockets 136 and 137 for selective reception of the outer end of the crank portion 107 of the crank 106. Spirit levels 138 are mounted on the base 1 and are useful in assuring that the machine is level on its supporting surface.

In order to insure that the channel bars of the length grading unit assembly will be retained in their proper operative position, cross braces 139, of U-shape formation in cross section, are connected to each of said channel bars and to the opposite sides of the assembly.

The operation of my improved separating and grading machine will now be set forth in more detail. First, the grain, in a conglomerate mass, is placed in the feed chute 37. The power source is then placed in operation for rotating the drive gear 31, with the result that the pinion 35 will be rotated at a high rate of speed and the eccentrically mounted link 27 rotated for imparting reciprocatory movement to the carriage 7 through the beams 25. As heretofore stated, when the gear 31 is rotated at a speed of one hundred twenty revolutions per minute, in a clockwise direction, the eccentrically mounted link 27 will be caused to impart thirteen hundred seventy forward and backward movements per minute to the carriage and, of course, to the grading units on the carriage. As the carriage is reciprocated, or oscillated, the grain will feed from the feed chute 37 through the discharge trough 40 and onto the entering portion 43 of the width grading unit 41. As the carriage continues to oscillate, the grain kernels will feed onto the grading portion 44. The larger sizes of grain kernels, for example, will drop off of the grading portion 44 and into the chutes 48, 49 and 50. That is to say, the largest of the grain kernels will drop into the chute 48 and, as progressively small kernels pass along they will progressively drop into the other chutes. In more detail, the width grading unit has six divisions for corn kernels, other kernels being allowed to pass onto the thickness grading unit 66. The corn kernels received in the chutes 48, 49 and 50 are led to the compartments 111, 112, 113, 114, 115, and 116 in the bin 102 at the front thereof. The length grading units b have been described briefly hereinbefore and include a spreader portion 99, a deflector 100 and a discharge opening 101. For large sized grain kernels such as corn kernels, the length grading units are correspondingly large. It is, of course, to be understood that the chutes 54, 55, 56, 57, 58 and 59 lead the corn kernels from the chutes 48, 49 and 50 onto the length grading units. The chutes 51, 52 and 53, also adapted for receiving, progressively, small grain kernels, lead said kernels through the troughs 60, 61 and 62 and through the troughs 63, 64 and 65, to the compartments 119, 120, and 121.

The kernels passing into the compartments 119, 120 and 121 are not graded as to length or thickness, due to the fact that it has been found unnecessary to grade kernels of this particular size. In other words, kernels of this size will be of a particular variety and will thus not need to be graded.

As the grains pass from the width grading unit on the thickness grading unit, said thickness grading unit will operate to regulate the thickness of the kernels passing into the chutes associated therewith. More specifically, the thickness measuring bar 69 will cooperate with the grading bar 67 in such a manner that the thinnest of the grain kernels will first drop from the grading bar into the chute 71. As the kernels are progressively thicker, they are discharged from between the thickness measuring bar and the grading bar into the chutes 72 through 80. The troughs 82 through 88 lead the thickness graded kernels to the troughs 89 through 95, which last mentioned troughs lead the grain kernels to the length grading units where they are graded as to length in a manner to be set forth in more detail and passed into the compartments 123 through 130 and 132 of the bin 102.

Figures 11, 12, 13, 14, 15, 16, 17, 18:
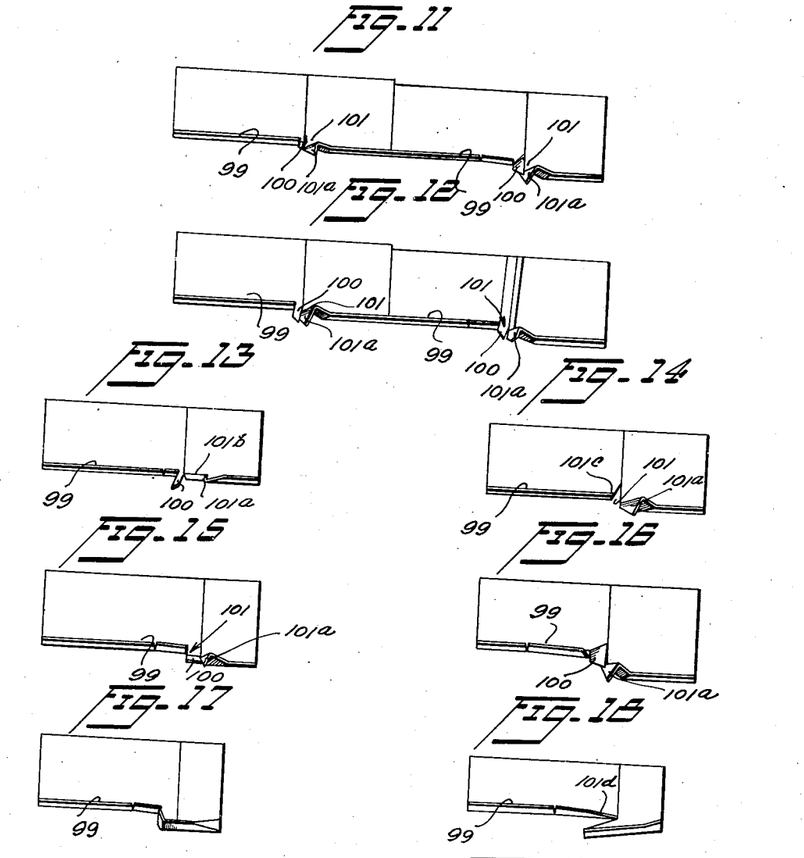
Figure 11 is a semi-diagrammatic view showing one embodiment of a length grading unit.
Figures 12 through 16 are semi-diagrammatic views showing various types of length grading units.
Figures 17 through 19 are semi-diagrammatic views of turn-over units.

In order to describe the construction and operation of the length grading units, Figures 11 through 20 have been inserted. As will be observed by referring to these figures, which are on an enlarged scale, the length grading units are tilted as they would be when mounted on the assembly 97. Referring first to Figure 11, this view shows two of the length grading units arranged in line. The numerals 99, 100 and 101 refer respectively to the spreader flange, the deflector, and the discharge opening. The spreader flange is, of course, adapted to have fed thereon the grain kernels from the thickness grading unit. Grain kernels, such as cockle, wheat and oats, are adapted to flow along the flange. As the grain kernels flow along, the cockle first drops over the edge and onto the deflector and is turned thereby toward the outer edge of the flange and against the grading bar and material guide and dropped. The wheat kernels, being long, are carried over the discharge opening 101 and the oat kernels are also carried past said discharge opening, being larger in size. As the wheat and oat kernels pass along the adjacent spreader flange, the wheat drops into the second discharge opening, strikes the deflector, is turned at an angle thereby against the grading bar and material guide and dropped. The grading bars and material guides are indicated at 101a. The oat kernels, being longer, pass over the second opening and flow along the remainder of the spreader flange to the end thereof and are dropped. It should be understood that one or more length grading units for each size cockle may be mounted in line and, if needed, one or more turnover members, as shown in Figures 17, 18, 19 and 20, may be inserted between the length grading units. Moreover, more than one length grading unit may be mounted in line for each size of other grains of material and, if desirable, turnovers or end turns inserted where necessary.

Referring to the embodiment shown in Figure 12, there is shown two of the length grading units which are mounted in the same longitudinal plane, like the embodiment shown in Figure 11, one larger to handle the second lot of larger kernels of cockle, wheat and oats from the thickness grading unit. The wheat deflector is of a different type from that shown in Figure 11. More specifically, as the wheat kernels pass over the drop edge and start to drop, they strike the deflector and are turned slightly to head away from the back. In this position, the rear end of the kernel, being raised a little above the spreader flange, is allowed to move toward the back so that the wheat kernels are turned even more at an angle and are headed in an outward direction and out of line with the flow on the spreader flange so far that they are forced away from the grading bar and outward and downward. The oat kernels, and barley kernels, if present, are longer and pass over the discharge opening. This type of deflector has proven best for wheat and barley separation as the short span provided allows the wheat kernels to drop. Because of said short span, however, the barley kernels, which sometimes have broken ends, can pass over the span and grading member to better advantage.

The embodiment shown in Figure 13 is a length grading unit for dropping cockle and passing buckwheat kernels along with other grains. The grading bar 101a is cut square so that the medial sharp edge 101b thereon grips the rough horn-like projections of the cockle and acts to turn the cockle outwardly and downwardly. The buckwheat, being quite smooth and rounded, is not affected by the grading bar but passes over the span or discharge opening, to the next spreader flange. Inasmuch as the grading bar 101b is disposed obliquely, it acts as a guide or chute.

The embodiment shown in Figure 14 is a length grading unit adapted for dropping buckwheat kernels and passing wheat kernels as well as other grain kernels. As will be noted, no deflector is employed and the drop edge at the mouth of the discharge opening is cut at an angle oblique with the back wall. This arrangement demonstrates the adaptability of the grading unit for kernels of different angles varying from a right angle. As will be understood, the buckwheat kernels are not graded according to their exact length but, as said kernels drop over the obliquely disposed drop edge, indicated at 101c, they are directed outwardly at an angle or toward the outer edge of the spreader flange.

The embodiment shown in Figure 15 is a length grading unit for dropping rye kernels and allowing barley kernels and other longer grain kernels to pass over the grading bar to the next spreader flange. As shown, the deflector 100 is disposed below the drop edge.

Figure 16 discloses an embodiment of the length grading unit for dropping barely kernels and permitting oats to pass over the grading bar to the next spreader flange. The deflector is shown as being obliquely disposed and slightly above the plane of the spreader flange.

Figure 17 is a turnover unit which alters the position of cockle or other material which has the same length, width and thickness dimensions. As the kernels fall over the drop edge of the spreader flange 99, they strike the narrow deflector 99a and are caused to turn over and flow in a different position on the flange 99b below the deflector.

Figure 18 discloses a turnover unit which turns wheat or other material having a length equal to or more than one and one-half times the width and thickness of the material. As wheat kernels flow on the narrow extension 101d of the flange, they drop over the edge in an outward direction and turn over and fall in a different position on the flange directly beneath the extension.

Figures 19, 19A:
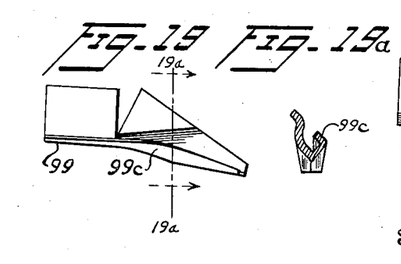
Fig. 19a is a vertical sectional view on the line 19a—19a of Fig. 19.

Figure 19 discloses a turnover unit particularly adapted for material having a width greater than its thickness. Barley, for example, is particularly adapted to be received in this type of turnover, although it should be understood that other types of kernels may be turned. Due to the inclination and other formation of this embodiment of the invention, the grain kernels are caused to flow at an increased speed and are turned over quickly. The turnover unit of Figure 19 includes the spreader flange 99, which is slightly widened and turned to an angular position approaching the vertical, as shown at 99c. In Figure 19a, the arrangement is better seen. Also, as seen in Figure 19, the upwardly turned portion 99c is downwardly inclined. It will now be understood that a grain kernel, moving along the flange 99 and onto the portion 99c, will be turned on edge and eventually turned over.

Figures 20, 20A:
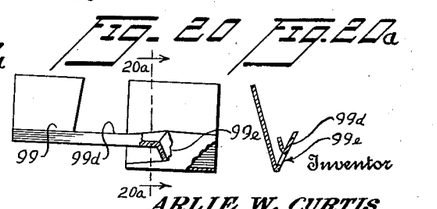
Figure 20 is a semi-diagrammatic view of a unit for turning the grain kernels end for end.
Fig. 20a is a vertical sectional view on the line 20a—20a of Fig. 20.

Figure 20 discloses a turnabout or end turn unit. As the grain kernels flow beyond the relatively narrow back portion, the outermost end swings downwardly toward the back so that the kernels will be moved toward the back and caused to turn end for end. The turn about the end turn unit illustrated in this figure, includes the flange 99 having an extended portion 99d which communicates with a turnover portion 99e. The extension 99d is somewhat inclined toward the portion 99e for insuring flow of kernels toward said portion 99e.

The turnover units shown in Figures 17, 18, 19 and 20 may or may not be needed for some materials. As stated, however, when needed, they may be inserted between length grading units. This may be better understood by referring again to Figure 12, which discloses two length grading units connected together in tandem as they would appear in a working machine. These two units may be separated and a turnover, such as shown in Figure 17, and another grading unit like the first one, to drop cockle, placed between the two units so that if the cockle, because of its irregular form and position on the spreader flange, should pass over the first discharge opening, the turnover would change the position of the cockle and the second grading unit would drop the cockle. As cockle seeds grow in compact clusters somewhat like a blackberry in shape, the cockle seeds are not uniform, some being quite flat and others a little elongated. As the opening in the length grading unit is adjusted to pass all wheat, it will be seen that some of the unusually shaped cockle may pass over the opening with the wheat. Thus, the turnover changes the position of the cockle so that it will be caused to flow in a position which will permit the cockle seed to drop at the opening in the next grading unit.

Attention is directed to the fact that the means for imparting oscillatory motion to the carriage may be varied in style to suit conditions. In other words, an electric vibrator may be employed, if desired. Also, it is desired to call attention to the fact that any suitable housing may be fitted over the machine and may be provided with such inlet and outlet openings as are necessary. The support for the carriage is shown as an elongated link. If desired, a flat spring may be used in lieu thereof, so long as the carriage is allowed to vibrate in an easy manner. The springs 23 and 24 serve to balance the weight of the machine with respect to the base. Moreover, in view of the fact that the supports are mounted as shown, the carriage will be raised slightly and lowered slightly as it is oscillated. This raising and lowering movement in conjunction with the oscillating motion, insures movement of the material along the various grading units. Inasmuch as the oscillatory motion is steady, the grain kernels will flow smoothly and not be caused to bounce out of position. Furthermore, close separation and grading of materials is assured by the smooth flowing movement. As will be clearly understood, the carriage may be vibrated at any desired speed, the speed of thirteen hundred seventy revolutions per minute for the motor being only given by way of example.

Referring to Figure 9 of the drawings, it will be seen that the bin 102 is so divided that weed seeds, cockle and buckwheat are carried in the left hand section, wheat and some rye in the middle section, and oats, barley and some long rye in the remaining or right hand section. As heretofore stated, the largest grain kernels are carried in the front compartments and smaller grain kernels in the rear compartments.

The foregoing statement applies to normally shaped grain kernels. However, some wheat kernels are only about half length or are nearly as wide as they are long. These usually drop in with the cockle seeds. Buckwheat with length and thickness about the same as the wheat, pass with the wheat kernels. Barley kernels with the ends broken off to about the same length also pass with the wheat kernels. However, the machine is capable of performing one hundred percent separation of all sizes of cockle and all sizes of oats, even broken oats, from all sizes of wheat.

Figures 21, 22:
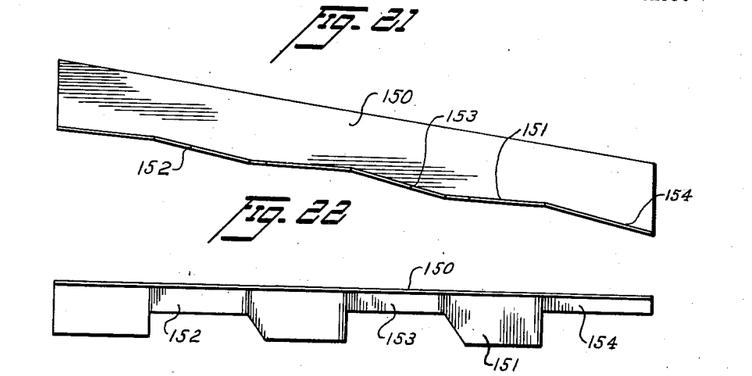
Figure 21 is a side elevation of a modified form of grading bar.
Figure 22 is a top plan view of the modified form of grading bar of Fig. 21.

Referring now to Figures 21 through 24 of the drawings, it will be seen that I have shown modified forms of grading units which will be more effective in certain installations than those shown in conjunction with the machine proper. In Figures 21 and 22, a width grader unit of a modified construction is shown. The grader unit of this embodiment includes a bar 150 and a grading flange 151. The grading flange is formed with inclined portions 152, 153 and 154. The actual grading takes place on these inclined surfaces 152, 153 and 154. The inclined portions are for the purpose of keeping each grain or piece of material from touching the next adjacent forward grain or piece of material so as to insure that each piece of material or grain will move freely along the flange 151.

Figures 23, 24:
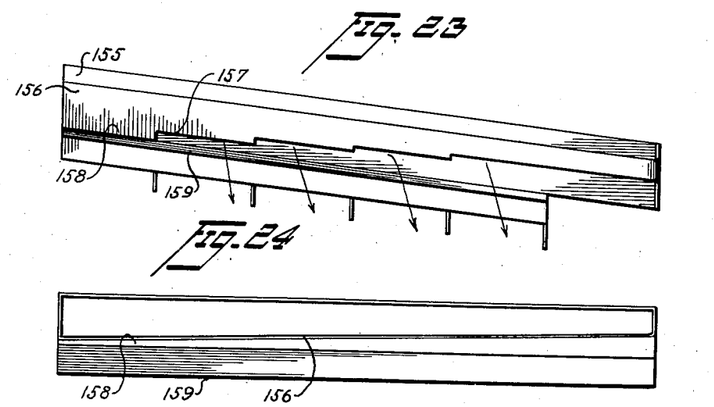
Figure 23 is a side view of a still further modified form of grading bar.
Figure 24 is a top view of the grading bar shown in Figure 23.

In Figures 23 and 24, a still further modified form of thickness grading unit is shown. In this embodiment of the invention, the back or body is shown at 155 and the grading bar at 156. The grading bar has a stepped edge 157, said steps gradually growing larger toward the lower end of the device. A slit or flange is shown at 158 and said flange is bent downwardly, at 159. The arrows indicate the flow of grain from this particular embodiment of thickness grading unit.

Figure 25:
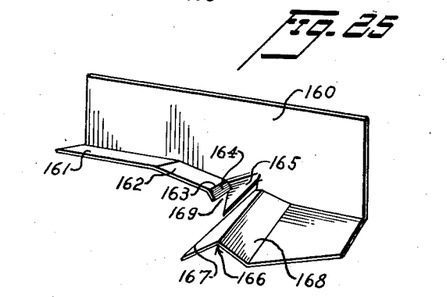
Figure 25 is an enlarged detail perspective view of a modified form of length grading unit.

Figure 25 illustrates a length grading unit of modified construction. The length grading unit includes a back or body 160 and a spreader flange or glide 161, said glide having an inclined portion 162 terminating in a drop edge 163. A material support is shown at 164 and a deflector at 165. The grading bar is shown generally at 166, this grading bar including a guide 167 and a chute 168. The distance between the drop edge 163 and the grading bar is indicated at 169 and is known as the span. The drop is the term employed for the distance that the grading bar is disposed beneath the drop edge 163.

The operation of this particular embodiment of length grading unit will now be set forth. Grain or other material will flow upon the flange 161 and will be speeded by means of the inclined portion 162. The inclined portion, thus, will serve to keep grains apart and thus insure free movement of each grain. The portion 164 supports some of the grains and enables them to pass over the span 169 and the grading bar 166 in order to obtain close separation. Some materials, like oats, are heavier at one end half of their lengths than at the other corresponding end halves. Therefore, when the grain fills with the heavier end last, the portion 164 holds up the heavier end of each grain until the lighter end can pass onto the grading bar sufficiently far to enable the grain to pass onto the chute 168 and onto the flange 161 of the next length grading unit. In separating barley from oats, closer adjustment of the span 169 is made to prevent the longer barley from passing over the grading bar with the oats. The ends of the barley are nearly equal and the portion 164 does not affect the barley action.

As the grain passes over the drop edge 163, the shorter grains strike the deflector 165 and are turned outwardly at an angle of varying degrees toward the outer edge of the flange 161. While the grains may strike the grading bar 166, they are cast off and outwardly and downwardly to the side, this outward and downward movement being aided by the guide 167. It should be understood that the portion 164, the deflector 165 and the guide 167 may be made longer or shorter if desired. In fact, when the machine is being used for some types of materials, these elements may be eliminated entirely.

In Figure 25, I have shown in detail a length grading unit and have shown particularly the span which is located at the end of the drop edge.

It is thought that the construction and operation of my improved separating and grading machine will be thoroughly understood.

Having thus described the invention, what is claimed is:

1. In a separating and grading machine, a base, a carriage mounted on the base for oscillatory movement thereon, means on one end of the base for imparting oscillatory movement to said carriage, resilient means for retaining the carriage under tension and provide counterbalance therefor, a width grading unit mounted on the carriage at one side of the upper portion thereof and having a width grading bar, said width grading bar including an entering portion and a grading portion, said grading portion gradually diminishing in width whereby material passing therealong will drop from the bar as the width diminishes to a point where the material may not remain on the bar, a discharge plate carried by the width grading unit, guides carried by the discharge plate, chutes carried by the carriage at one side thereof and adjacent the discharge plate, troughs connected with the chutes, a bin carried by the base beneath the carriage and having compartments disposed beneath the troughs for receiving material graded according to width, a feed chute mounted on the carriage, and a discharge trough leading from the feed chute to the entering portion of the width grading unit.

2. In a separating and grading machine, a carriage mounted for oscillatory movement, means for imparting oscillatory movement to the carriage, a feed chute mounted on the carriage and having a discharge trough, a width grading unit mounted on the carriage and having an entering portion connected with the discharge trough, said width grading unit having a grading bar provided with a grading portion for grading material according to width, a discharge plate mounted on the width grading unit, guides carried on the discharge plate, chutes mounted on the carriage adjacent the guides, said guides being effective for guiding graded and separated material into the chutes, a length grading unit mounted on the carriage and inclined with respect to the carriage, troughs connecting said chutes with the length grading unit, and means for receiving separated and graded material from the troughs.

3. In a separating and grading machine, a carriage, means for imparting oscillatory motion to the carriage, a width grading unit mounted on the carriage and including a grading bar having a grading portion, a feed chute mounted on the carriage and having a discharge trough communicating with the width grading unit, chutes mounted on the carriage adjacent the width grading unit, a bin beneath the carriage and having compartments, means for leading graded material from the width grading unit to certain of the compartments, a thickness grading unit mounted on the carriage in tandem relation with the width grading unit and having a thickness measuring bar and a grading bar, chutes associated with the thickness measuring unit, a length grading unit assembly mounted on the carriage and inclined with respect to the longitudinal dimension thereof, said length grading unit comprising a plurality of spaced channel bars, length grading units carried by each of the channel bars, and troughs connecting the thickness grading unit and chutes with the length grading units whereby the material graded for thickness will be passed to the length grading unit assembly and graded for length by the length grading units, all of said separating and grading taking place through oscillatory movement of the carriage and all of said material passing through to the compartments in the bin.

4. In a separating and grading machine, a substantially rectangular carriage having side and end beams, a feed chute mounted on the carriage, means supporting the feed chute on certain of said end beams, a width grading unit mounted on the carriage in parallel with one of the side beams, a discharge trough connecting the feed chute with the width grading unit, a plurality of chutes mounted in tandem along said side beam and adjacent the width grading unit, a thickness grading unit mounted on the carriage in tandem relation to the width grading unit, a plurality of chutes mounted in tandem and adjacent the side beam and the thickness grading unit and being adapted to receive material graded according to various thicknesses, a length grading unit assembly mounted on the carriage beneath the width and thickness grading units and being slightly inclined toward one end, said length grading unit assembly including a plurality of laterally spaced channel bars, a length grading unit mounted on certain of the channel bars, and troughs having end portions extending between the bars and opposite end portions connected with the chutes whereby material graded as to thickness will be led to positions for grading and separating as to length, and a bin removably mounted beneath the carriage and having compartments for receiving the graded material, said grading of material taking place during oscillation of the carriage.

5. In a machine of the class described, a length grading unit including a spreader flange, a deflector, a guide, said guide, spreader flange and deflector defining a discharge opening, said spreader flange being adapted for receiving a flow of material, and said discharge opening being of a predetermined size for admitting material of said size to pass into the discharge opening, said material being adapted to impinge the deflector and be deflected thereby away from the length grading unit and through the discharge opening.

6. In a machine of the class described, a unitary length grading unit including a spreader flange having a drop edge at one end, a grading bar and material guide formed on the unit and cooperating with the drop edge to define a discharge opening, and a deflector mounted on the unit near the drop edge and projecting into the discharge opening at an angle with respect to the flange and the back of the unit.

ARLIE W. CURTIS.